(12) United States Patent
Hämmerling

(10) Patent No.: US 11,978,982 B2
(45) Date of Patent: May 7, 2024

(54) CONTACT CARRIER AND PLUG CONNECTOR FOR A SHIELDED HYBRID CONTACT ASSEMBLY

(71) Applicant: HARTING Electric Stiftung & Co. KG, Espelkamp (DE)

(72) Inventor: Sergej Hämmerling, Bohmte (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 472 days.

(21) Appl. No.: 17/593,445

(22) PCT Filed: Mar. 5, 2020

(86) PCT No.: PCT/DE2020/100148
§ 371 (c)(1),
(2) Date: Sep. 18, 2021

(87) PCT Pub. No.: WO2020/187356
PCT Pub. Date: Sep. 24, 2020

(65) Prior Publication Data
US 2022/0190525 A1    Jun. 16, 2022

(30) Foreign Application Priority Data
Mar. 19, 2019   (DE) .................. 10 2019 106 980.7

(51) Int. Cl.
*H01R 13/648*   (2006.01)
*H01R 4/18*   (2006.01)
(Continued)

(52) U.S. Cl.
CPC .......... *H01R 13/648* (2013.01); *H01R 4/186* (2013.01); *H01R 13/502* (2013.01); *H01R 13/6586* (2013.01)

(58) Field of Classification Search
CPC .... H01R 13/648; H01R 4/186; H01R 13/502; H01R 13/6586
See application file for complete search history.

(56) References Cited

U.S. PATENT DOCUMENTS

| | | | | |
|---|---|---|---|---|
| 4,193,655 A | * | 3/1980 | Herrmann, Jr. ...... | H01R 13/502 439/271 |
| 6,190,202 B1 | * | 2/2001 | Lai ....................... | H01R 9/0518 439/578 |

(Continued)

FOREIGN PATENT DOCUMENTS

| | | |
|---|---|---|
| DE | 102010051954 | 2/2012 |
| DE | 202012008970 U1 | 10/2012 |

(Continued)

OTHER PUBLICATIONS

Connectors for electronic equipment—Product requirements—Part 2-113: Circular connectors—Detail specification for connectors with M12 screw locking with power and signal contacts for data transmission with frequency up to 100 MHz, Publication data: IEC 61076-2-113:2017,20170221,IEC, 3, rue de Varembé, PO Box 131, CH-1211 Geneva 20, Switzerland.

*Primary Examiner* — Phuong Chi Thi Nguyen
(74) *Attorney, Agent, or Firm* — Smartpat PLC

(57) ABSTRACT

In order to receive eight electrical crimp contacts, namely four electrical signal contacts and four electrical power contacts, and a Y-shaped shielding element in a hybrid electrical plug connector, according to the invention a contact carrier is designed in multiple parts, in particular three parts, wherein the signal contact receivers are located in the first contact carrier part. The central contact can be positioned on the first or second contact carrier part. When fastening these two contact carrier parts to one another, the central contact can thus be fixed between the two contact carrier parts. Furthermore, the Y-shaped shielding element is (Continued)

held on a holder of the first contact carrier part. This assembly is jointly inserted into the sleeve-shaped third contact carrier part so that the central contact is positioned with its plug-in region substantially centrally in the plug-in face of the plug connector.

16 Claims, 10 Drawing Sheets

(51) Int. Cl.
    *H01R 13/502*    (2006.01)
    *H01R 13/6586*   (2011.01)

(56) References Cited

U.S. PATENT DOCUMENTS

| | | | |
|---|---|---|---|
| 6,494,743 B1 | 12/2002 | Lamatsch et al. | |
| 7,637,775 B2 * | 12/2009 | Chang | H01R 13/502 |
| | | | 439/594 |
| 8,764,471 B2 * | 7/2014 | Dang | H01R 13/6463 |
| | | | 439/310 |
| 2013/0137310 A1 | 5/2013 | Genau | |
| 2014/0291009 A1 | 10/2014 | Schreier et al. | |
| 2015/0270647 A1 | 9/2015 | Höher et al. | |
| 2016/0049747 A1 | 2/2016 | Yu et al. | |
| 2016/0359258 A1 | 12/2016 | Koester | |
| 2018/0323549 A1 | 11/2018 | Vogel et al. | |

FOREIGN PATENT DOCUMENTS

| | | |
|---|---|---|
| DE | 102015210336 A1 | 12/2016 |
| DE | 102015119087 A1 | 5/2017 |
| EP | 3104469 B1 | 12/2016 |
| EP | 2745354 B1 | 5/2017 |

* cited by examiner

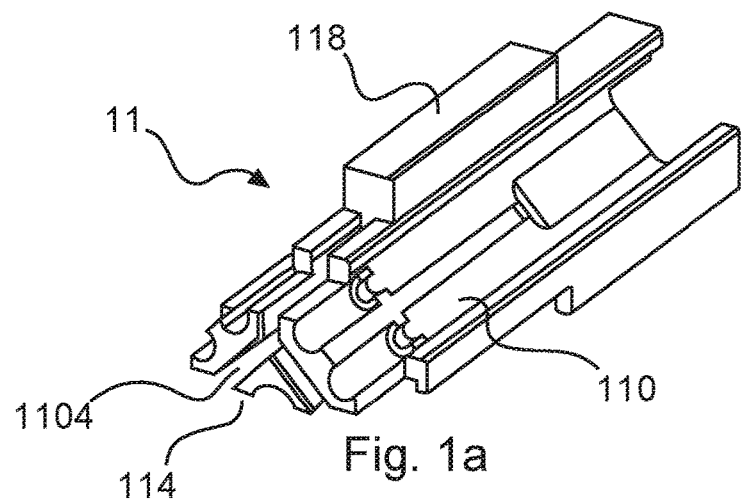
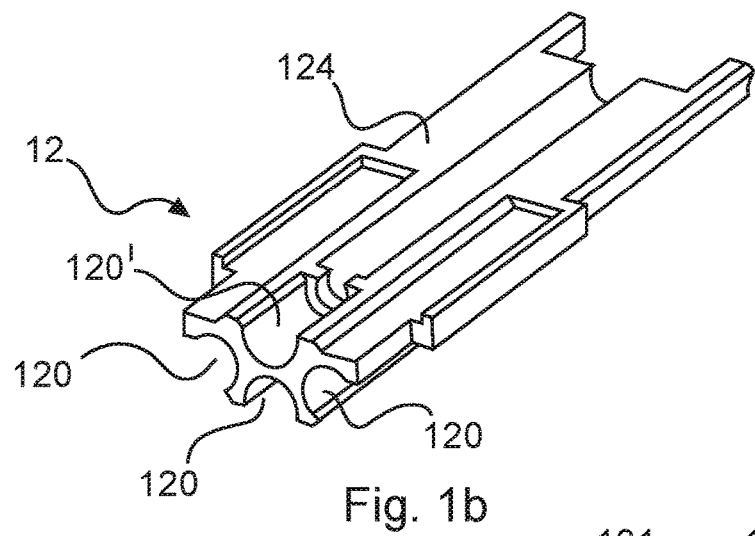
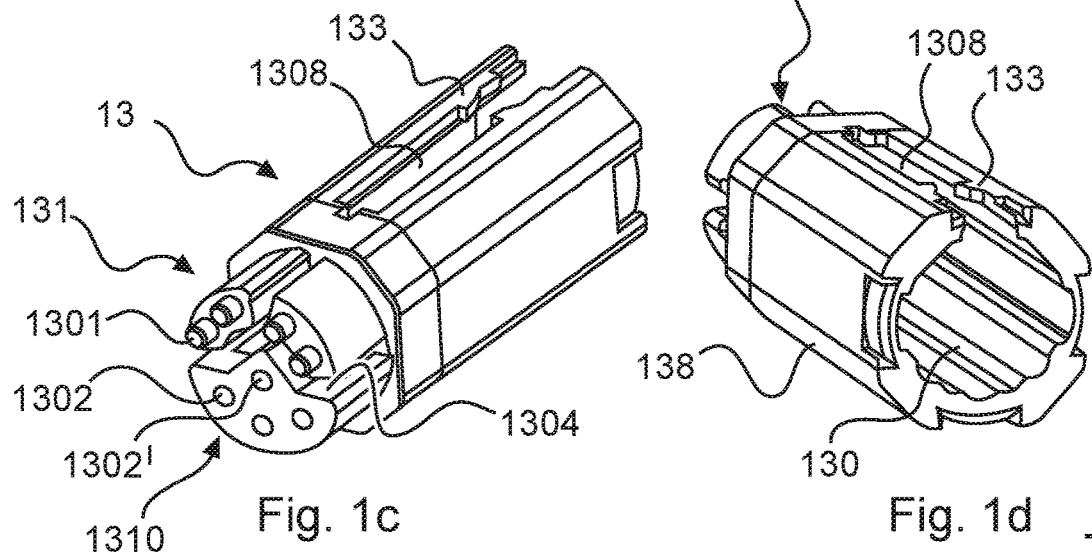

CONTACT CARRIER AND PLUG CONNECTOR FOR A SHIELDED HYBRID CONTACT ASSEMBLY

TECHNICAL FIELD

The disclosure relates to a contact carrier for a plug connector for a shielded hybrid contact arrangement.

The disclosure further relates to a system, formed from a Y-shaped shield element, and at least four crimp contacts, of which at least two are designed as signal contacts and at least two are designed as power contacts, and a contact carrier.

The disclosure further relates to a plug connector which comprises such a system, and to a method for assembling such a system.

Such contact carriers are required to hold a plurality of electrical signal and power contacts in a plug connector such that they are shielded from each other.

BACKGROUND

Plug connectors with shield elements for signal separation of four different differential signal pairs are known in the prior art, for example from printed document EP 2 745 354 A1. A shield element suitable for this can also be referred to as a "shield cross" or as "X-shaped" or X-coded" owing to its shape.

By way of example, printed document DE 10 2015 119 087 A1 discloses a hybrid plug connector. Both electrical power and electrical signals can be transmitted by such "hybrid transmission contact arrangements". Whilst the arrangement disclosed in this printed document uses a shield housing, "Y-shaped shield elements" are also known for such hybrid plug connectors, for example from International Standard IEC 61076-2-113. For example, by means of such a Y-shaped shield element, two pairs of differential signal transmission plug contacts in a contact carrier can be shielded from each other and moreover from electrical power transmission plug contacts which are likewise held in the contact carrier. In this case, due to the design, the plug contacts are already permanently installed in the contact carrier at the factory. This can take place, for example, in that the plug contacts together with the shield cross are overmolded with plastic, wherein the plastic forms the contact carrier. The plug contacts can therefore no longer be removed from the contact carrier during connection, assembly and/or installation of the plug connector. These plug contacts can be solder contacts, for example, which also have a solder connection on the cable connection side and can be freely configured for the respective application during installation by the user of the plug connector, e.g. by solder-connecting wires of a multi-wire electric cable.

The disadvantage of this prior art is that plug connectors, in particular with a central contact and which enable on-site assembly of such Y-coded shieldings for crimp connectors, do not exist.

The German Patent and Trademark Office has searched the following prior art in the priority application relating to the present application: DE 10 2015 210 336 A1, U.S. Pat. No. 6,494,743 B1, EP 3 104 469 A1, DE 10 2010 051 954 B3 and US 2016/0049747 A1.

SUMMARY

The object of the invention consists in specifying a contact carrier for a plug connector, which also permits such a Y-coding for crimp contacts.

This object is achieved by the features as claimed.

A contact carrier for a plug connector is provided for receiving at least four, preferably eight, electrical crimp contacts. At least two, preferably four, of the crimp contacts are designed as signal contacts and at least a further two, preferably four, of the crimp contacts are designed as power contacts.

In this case, the numerical information "at least two, preferably four" essentially implies, for example, that also at least four and therefore also more than four power contacts or signal contacts can be provided. In the same way, at least four, preferably eight crimp contacts implies that also at least eight crimp contacts, i.e. more than eight crimp contacts, for example, can be provided.

To this end, the contact carrier has at least two, preferably four, signal contact receptacles and at least two, preferably four, power contact receptacles. The contact carrier is furthermore designed in multiple parts. A first contact carrier part comprises the at least two, preferably four, signal contact receptacles. A second contact carrier part comprises at least one, preferably at least three, of the power contact receptacles. A further one of the power contact receptacles is arranged as a central contact receptacle in the contact carrier, between the first and the second contact carrier part.

In this case, this central contact receptacle can be arranged at least mostly in the first contact carrier part or at least mostly in the second contact carrier part or equally in the first and in the second contact carrier part.

The central contact receptacle serves for receiving one of the power contacts, which is a central contact. Therefore, the entire contact carrier has a total of at least four, preferably eight, contact receptacles. One of the two said contact carrier parts, preferably the first contact carrier part, comprises a holder, by means of which a Y-shaped receiving slot is preferably formed in the contact carrier. A Y-shaped shield element can be held on the holder, in particular by the Y-shaped holding slot, by means of which shield element at least two signal contact receptacles can be separated both from each other and from the power contact receptacles. In particular, the first contact carrier part can have four signal contact receptacles and two pairs of signal contact receptacles can therefore be separated both from each other and from the power contacts by the shield element. This is particularly advantageous for the differential signal transmission.

In this case, the numerical information "at least two, preferably four" essentially implies, for example, that also at least four and therefore also more than four power contact receptacles or signal contact receptacles can be provided in the contact carrier. In the same way, at least four, preferably eight contact receptacles implies that also a total of at least eight, i.e. for example more than eight, contact receptacles can be provided in the contact carrier.

Advantageous configurations of the invention are specified in the subclaims.

The invention is particularly advantageous in that crimp contacts can now also be used as plug contacts in a Y-coded plug connector, in particular in a manner enabling on-site assembly, whereby the advantages for which crimping is known, namely its ergonomic manufacture and its durable and safe conductivity with a low contact resistance, are advantageously also enabled for the typical hybrid plug-connector design.

At least one of the two said contact carrier parts, i.e. the first and/or the second contact carrier part, has the said holder on which the Y-shaped shield element can be held/fastened. The first contact carrier part preferably has this holder. By means of the Y-shaped shield element, it is ensured that the pairs of signal contact receptacles can be separated both from each other and from the power contact receptacles by a respective portion of the shield element.

A further advantage is that the central contact, which is a power contact, can be arranged substantially centrally in the mating face of the contact carrier as seen from the mating direction since the available space can thus be used particularly advantageously, which is particularly advantageously enabled as a result of the multi-part design of the insulating body. In this regard, "substantially centrally" means that the spacing of an axis of symmetry of the basic shape of the central contact from an axis of symmetry of the basic shape of the contact carrier is not greater than 20%, preferably not greater than 15%, in particular not greater than 10% and particularly preferably not greater than 5% of the diameter of the contact carrier.

By way of example, the contact carrier can have a cylindrical shape since it is provided, for example, for a circular plug connector. The circular connector can be of the type described in Standard IEC 61076-2-113 from the year 2017, for example. In this example, the diameter of the contact carrier can be 8.3 mm. The central contact can then be 0.4 mm off-axis, i.e. the spacing between the said two axes of symmetry is then less than 5% of the diameter of the contact carrier.

It is advantageous that this central contact is provided for electrical power transmission; i.e. it is a power contact. The power contacts ultimately have a greater spatial requirement than the signal contacts. For signal separation, it is furthermore advantageous to separate two signal contacts, preferably two signal contact pairs, both from each other and from the power contacts by means of the Y-shaped shield cross.

The crimp contacts each comprise a crimp connection on the cable connection side and a mating area on the opposite side. The mating area can be formed by a contact pin or a contact socket.

In a preferred configuration, the crimp contacts each comprise a substantially cylindrical mating area by means of which a respective contact pin is formed. In this case, the crimp contacts are therefore pin contacts. In this regard, "substantially" means, amongst other things, that the mating area can be rounded at its end. The diameter of the signal contact can also taper slightly towards the mating-side end in the mating direction in certain areas. The contact pins of the signal contacts can then have a diameter which has a slight conical taper, at least in certain portions, but which can also have a cylindrical design in certain portions, in particular in the end mating area. In another configuration, the contact pins can be installed to be cylindrical over their entire area. Furthermore, the mating areas of the signal contacts can have a smaller diameter than the mating areas of the power contacts.

In an alternative configuration, the crimp contacts are socket contacts. They then each comprise a substantially hollow cylindrical mating area, by means of which a respective contact socket is formed. The contact sockets of the power contacts can have an internal diameter which is greater than the internal diameter of the contact sockets of the signal contacts.

Accordingly, the power contact receptacles of the insulating body can also have a greater diameter than the signal contact receptacles, at least in certain areas.

The connection of the cable to the plug connector is conventionally carried out during the installation of the plug connector, i.e. at the customer's end and generally also by the customer using the plug connector.

In contrast to other cable-side contacting methods, for example soldering the individual cable strands to a respective cable connection area of a plug contact, a crimp connection must already be assembled before installation in the contact carrier, i.e. each crimp contact, at its crimp connection on the cable connection side, is essentially firstly crimped to an electrical conductor, e.g. the wire, of a multi-wire cable outside the contact carrier and then integrated in the contact carrier.

As a result of the multi-part configuration of the contact carrier, it is possible to take into account the desire on the part of a customer for the plug connector to be assemblable on site, i.e. for the customer to be able to assemble, i.e. in this case to crimp, the connector himself using conventional tools, e.g. a crimping tool, and then integrate it in the contact carrier. He is thus able to determine the correct cable length at the site of operation and connect the connector to permanently installed cables, etc.

In particular, it is advantageous that, if required, the customer can use a mating face with a central contact. Such a central contact enables better use of the mating surface, in particular in the case of a circular plug connector, and therefore enables the number of plug contacts to be increased. Many conventional mating faces of corresponding mating connectors comprise such a central contact, so the enablement thereof is also particularly advantageous for reasons of compatibility.

To this end, it is advantageous that the contact carrier has a multi-part design since the central contact can thus be arranged between at least two contact carrier parts, in particular the first and the second contact carrier part. In particular, the contact carrier can comprise three contact carrier parts, of which at least two contact carrier parts, namely a first and a second contact carrier part, can be fixed to each other, in particular latched to each other. The contact carrier can thus firstly be equipped with the crimp contacts during the installation of the plug connector and then assembled, i.e. put together. This applies in particular when using the said "central contact", which is essentially notable in that its mating area is arranged substantially centrally in the mating face of a plug connector to which the contact carrier belongs.

The customer, who can be regarded as the user of the plug connector, is therefore able to firstly crimp the plug contacts to electrical conductors on the cable connection side, i.e. to the wires of a multi-wire electrical cable, during assembly. The plug contacts which are, in particular, crimped at the site of operation can then be integrated in the first contact carrier part and in the second contact carrier part of the insulating body. These two contact carrier parts of the insulating body can then be put together, wherein at least part of the Y-shaped shield element is arranged on at least one of the contact carrier parts or between them, at least in certain areas. For holding the Y-shaped shield element, at least one of the two contact carrier parts, in particular the first contact carrier part, can preferably comprise the said holder on which the Y-shaped shield element is held. The Y-shaped shield element can additionally be fixed between the first and the second contact carrier part as a result of these being fastened together.

One or more contact carrier parts can be joined to the associated portions of the Y-shaped shield element, at least with partial form fit, during assembly. At least two contact carrier parts can be joined to the Y-shaped shield element on the cable connection side and therefore protrude beyond the Y-shaped shield element on the cable connection side. They can therefore preferably be fastened to each other in this area, for example as a result of being latched together. In particular, they can thus also hold, and thus advantageously additionally fasten, the Y-shaped shield element between them, at least in certain areas.

The Y-shaped shield element is formed from an electrically conductive material or comprises at least electrically conductive areas, e.g. an electrically conductive coating. In particular, the Y-shaped shield element can consist of metal. The Y-shaped shield element advantageously has electrically and/or magnetically shielding properties. In particular, the shield element can be formed as a zinc die-cast part and can be coated with nickel. Particularly good electrical and/or magnetic shielding can thus be achieved.

The Y-shaped shield element is designed in one piece; it therefore has three shield portions, namely a first, a second and a third shield portion, which are molded to each other on a common axis. In particular, the Y-shaped shield element can have a substantially mirror-symmetrical design in terms of its basic shape, wherein the mirror plane extends through the first shield portion.

In an advantageous configuration, the first and the second contact carrier part can be fixed to each other. In particular, they are thus fixed against a movement at a right angle to the mating direction, in particular against a movement away from each other.

In a particularly advantageous configuration, the Y-shaped shield element, provides a means of preventing these two contact carrier parts from twisting with respect to each other, in particular by means of molded anti-twist surfaces. This facilitates manufacture compared to a variant in which this would have to be effected by the insulating body itself. The injection molding tool of the contact carrier thus advantageously does not require devices for manufacturing such anti-twist means, such as additional slides for the anti-twist protection serve latching means, pins or the like.

In a further preferred configuration, a third contact carrier part of the preferably three-part contact carrier is formed by a sleeve with an insertion opening on the cable connection side. The first and the second contact carrier part can be pushed into the sleeve in the fixed-together state, together with the Y-shaped shield element held thereon and, in particular, also with the crimp contacts received in the contact carrier.

Opposite the insertion opening, the third contact carrier part can furthermore have a mating portion with through-openings which are suitable for guiding-through mating areas of the crimp contacts on the mating side and and/or for guiding-through a mating-side portion of the Y-shaped shield element. The through-openings can advantageously correspond thereto in terms of their arrangement and form.

One of the, in particular, four power contacts, namely the central contact, can be arranged with its mating area substantially centrally in this mating portion.

A method for assembling such a contact carrier can comprise the following steps:
  mounting the Y-shaped shield element on the holder of the multi-part contact carrier;
  crimping electrical conductors to the crimp contacts;
  placing the central contact in the associated power contact receptacle of the multi-part contact carrier;
  mutually fixing the first and the second contact carrier part to each other;
  incorporating the signal contacts in the signal contact receptacles of the first contact carrier part and incorporating the power contacts, with the exception of the already incorporated central contact, in the power contact receptacles of the second contact carrier part;
  jointly pushing the first and second contact carrier part with the Y-shaped shield element held thereon and the crimp contacts received therein into the third contact carrier part through the insertion opening of the third contact carrier part.

The first-mentioned method step, namely mounting the Y-shaped shield element on the holder of the multi-part contact carrier can already be carried out at the factory, i.e. the customer obtains the first contact carrier part from the plug connector manufacturer with the shield element pre-assembled thereon, but can carry out the further method steps himself. This enables on-site crimping of a plug connector with a central contact.

By ultimately pushing the first two fixed-together contact carrier parts into the third contact carrier part, the mating areas of the crimp contacts can be guided into and preferably also through the through-openings so that they protrude on the mating side, in particular if they are pin contacts, but can also terminate with the mating surface if they are socket contacts.

It goes without saying that the sequence of the method steps is not essentially binding. If it appears useful to a person skilled in the art, some of the method steps can also be implemented in a different sequence. At this point, a more precise listing of all possible sequences of the method steps is omitted since devising a useful sequence according to the considerations above depends on the understanding and the competencies of an average person skilled in the art.

In summary, but without being restrictive, the following configuration, amongst others, is revealed to a person skilled in the art from the above considerations: To receive the eight electrical crimp contacts, namely four electrical signal contacts and four electrical power contacts, and a Y-shaped shield element in the hybrid electrical plug connector, the contact carrier can be designed in multiple parts, in particular three parts. In this case, the signal contact receptacles for receiving the signal contacts are arranged in the first contact carrier part. The central contact, depending on the design, can be arranged on the first or from the second contact carrier part and, in particular, latched thereto. The further power contact receptacles are arranged in the second contact carrier part to receive the further power contacts. When these two contact carrier parts are fastened to each other, the central contact can therefore come to lie between the two contact carrier parts, namely the first and the second contact carrier part, and can be held there. Moreover, the Y-shaped shield element can be held on a holder of the first contact carrier part and, in this case, can be arranged between the first and second contact carrier part, at least in certain areas. This arrangement, consisting of the first and the second contact carrier part, the crimp contacts received therein and the Y-shaped shield element held thereon, is then collectively pushed into the third contact carrier part. In this case, the mating areas of the crimp contacts and the Y-shaped shield cross reach through a mating-side portion of the third contact carrier part. In this case, the central contact is arranged with its mating area substantially centrally in the mating face of the plug connector. At the same time, the signal contact pairs are electrically and/or magnetically shielded from each other and from the power contacts by a respective portion of the Y-shaped shield element.

BRIEF DESCRIPTION OF THE DRAWINGS

An exemplary embodiment of the invention is illustrated in the drawings and will be explained in more detail below. In the drawings:

FIGS. 1a-d show a three-part contact carrier;

DETAILED DESCRIPTION

Figures 2A, 2B:
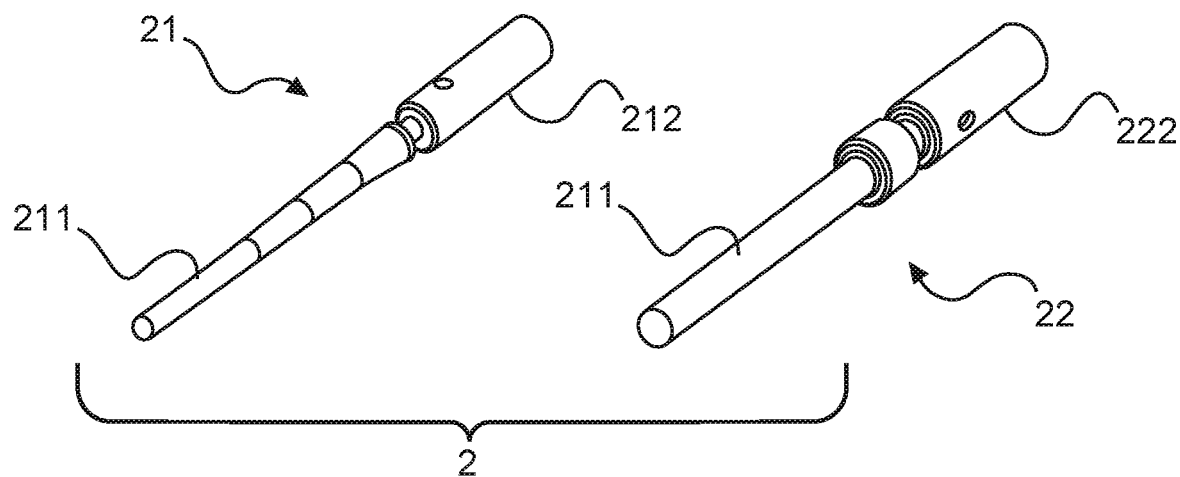
FIGS. 2a, b show two crimp contacts.

The figures contain partially simplified, schematic illustrations. Identical reference sings are sometimes used for elements which are similar but possibly not identical. Different views of similar elements may be drawn to different scales.

FIGS. 1a-d show a three-part contact carrier 1, which consists of a first 11, a second 12 and a third 13 contact carrier part.

FIG. 1a shows the first contact carrier part 11 in a first embodiment. This contact carrier part 11 has substantially the basic shape of a three-sided isosceles prism, whereof the cross-section is therefore formed by an isosceles triangle. Two outwardly open signal contact receptacles 110 are arranged in each leg surface of the prism-like basic shape. At their common limb edge, a cuboidal latching molding 118 is molded in a central portion in the mating direction. A Y-shaped receiving slot 1104 adjoins this latching molding 118 on the mating side. The Y-shaped receiving slot 1104 is delimited by a holder 114 on the base side.

FIG. 1b shows the second contact carrier part 12 in a first embodiment. This has four power contact receptacles 120, 120', of which one is designed as a central contact receptacle 120' and is arranged in a contact surface 124, which, when joined to the first contact carrier part 11, adjoins the base surface thereof and the holder 114 of the base surface. Opposite the contact surface 124, the second contact carrier part 12 has an outer contour which, in cross-section, extends circle segment-like and in which the further three power contact receptacles 120 are arranged such that they are outwardly open.

FIGS. 1c and 1d show the third contact carrier part 13, which has a substantially sleeve-shaped design. On the mating side, the third contact carrier part 13 has a mating portion 131 with a mating side 1310 through which through-openings 1301, 1302, 1302', 1304 extend. These are signal contact through-openings 1301, power contact through-openings 1302 with a central contact through-opening 1302' and a substantially Y-shaped shield element through-opening 1304. In this case, "substantially" means that the mutually mirror-symmetrical portions of the Y shape bend away from each other in their end areas.

Adjoining the mating portion 131, the third contact carrier part 13 has a sleeve-shaped base portion 138 with an insertion opening 130 on the cable connection side, which is arranged opposite the mating surface 1310. Adjoining this insertion opening 130, a latching slot 1308, which is open on the cable connection side, is arranged in the base portion 138 such that it extends in the direction of the mating side. Molded thereon on both sides and protruding laterally into the latching slot 1308, mutually facing latching hooks 133 are incorporated in the base portion 138 at the slot edges. The latching hooks 133 have angled slide portions on the cable connection side.

FIGS. 2a and 2b show two types of crimp contact 2, i.e. plug contacts with crimp connections 212, 222 on the cable connection side.

Contact pins with substantially cylindrical mating areas 211, 221 are arranged opposite the crimp connections 212, 222. The contact pins are rounded at their mating areas 211, 222 on the mating side. The contact pin of the power contact 22 furthermore has a cylindrical design. The contact pin of the signal contact 21 extends cylindrically at least in its mating area 211, but slightly conically in at least a further portion which is not shown in more detail.

Figure 3:
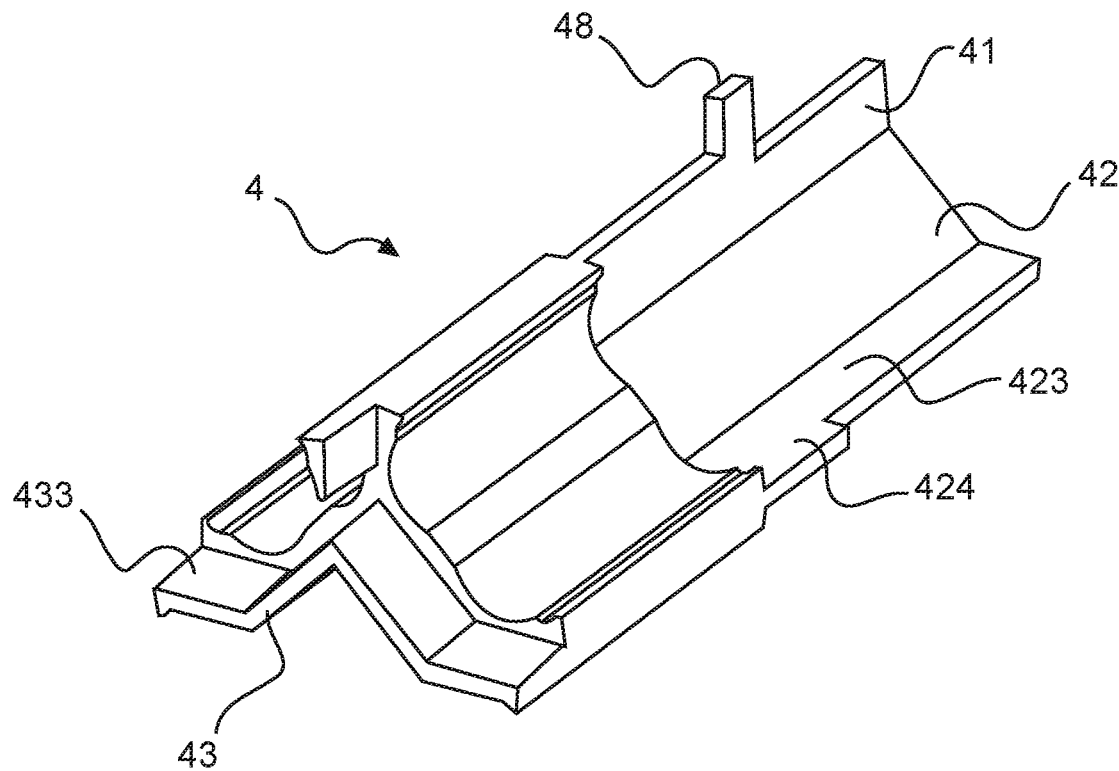
FIG. 3 shows a Y-shaped shield element.

FIG. 3 shows a Y-shaped shield element 4 which has a substantially mirror-symmetrical design, i.e. apart from minor deviations.

This shield element comprises a first 41, a second 42 and a third 43 portion. The two mutually mirror-symmetrical portions, namely the second 42 and the third 43 portion of the Y shape, extend firstly at an angle to each other and then bend away from each other with anti-twist surfaces 423, 433 molded at their end areas. On their outer areas, the anti-twist surfaces 423, 433 each additionally have a stop step 424, of which only one can be seen in the drawing since the other is covered by the first portion 41 of the shield element 4.

Figure 4A:
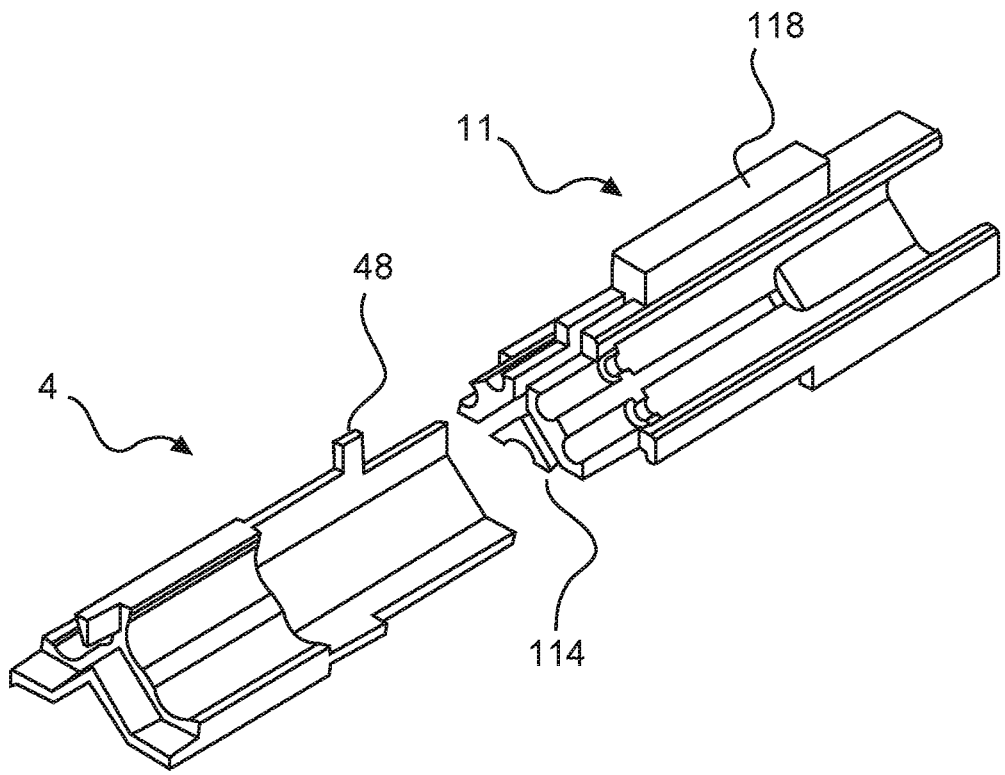
FIGS. 4a, b show the first contact carrier part with the shield element.
Figure 4B:
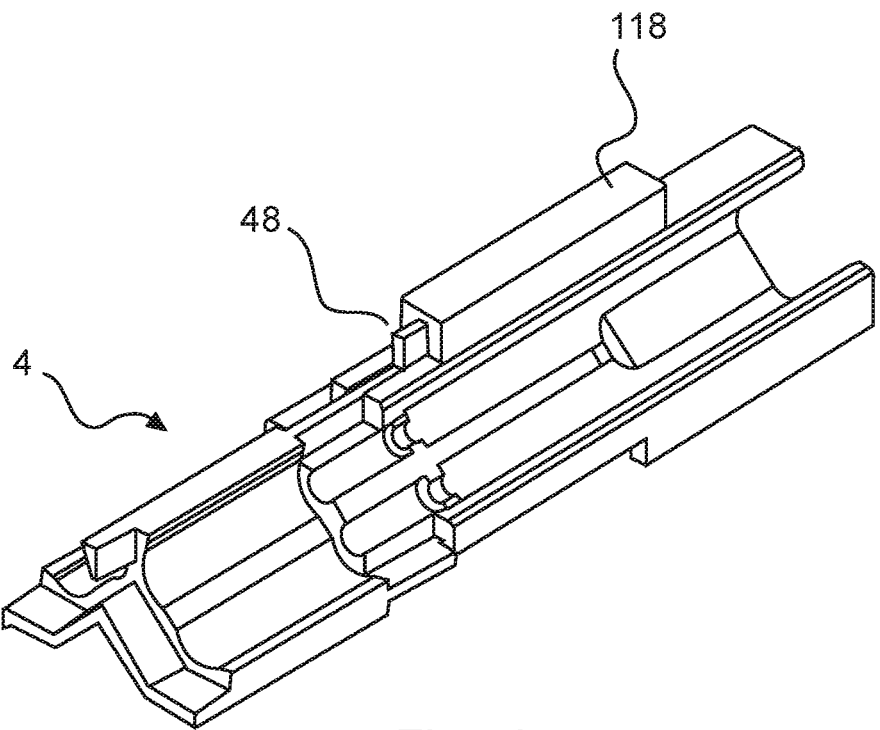

The first portion 41 of the shield element 4 lies substantially in the plane of symmetry thereof. A stop molding 48, which also fulfills the function of a ground connecting element below, is molded on the outer edge of said shield element, FIGS. 4a and 4b show the first contact carrier part 11 together with the Y-shaped shield element 4, which is pushed into the Y-shaped receiving slot 1104 of the first contact carrier part 11 and thus held on the holding portion 114 thereof. In the pushed-in state, the stop molding 48 of the shield element 4 strikes the cuboidal latching molding 118 of the first contact carrier part 11 and thus prevents it from being pushed in further.

Figures 5A, 5B:
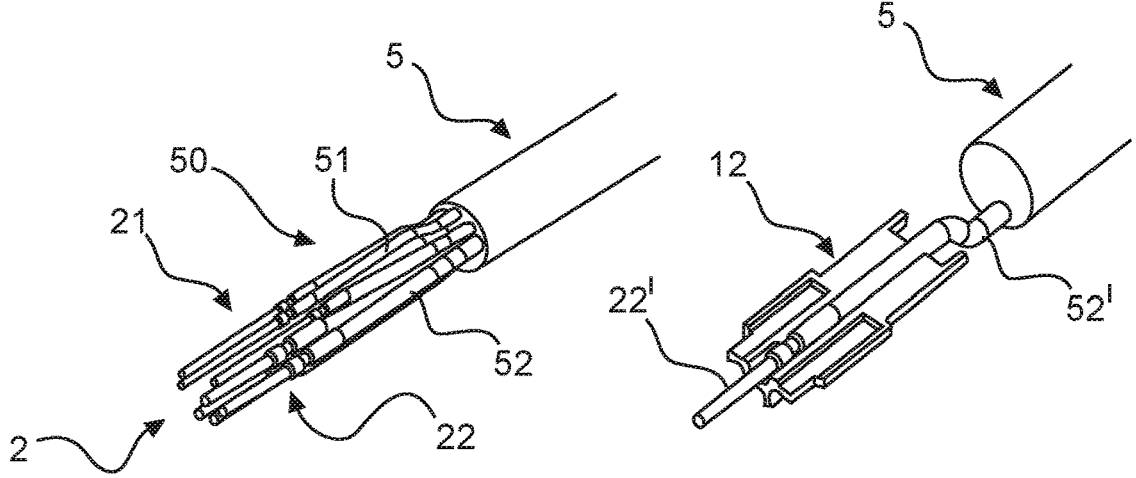
FIG. 5a shows a multi-wire cable with crimped crimp contacts.
FIG. 5b shows the cable with a central contact placed in the second contact carrier part.

FIG. 5a shows a cable 5, namely a so-called hybrid cable, which is notable in that it has both signal wires 51 for electrical signal transmission and power wires 52 for electrical power transmission. This cable 5 has a total of eight wires 50, namely four signal wires 51 and four power wires 52, which are each surrounded at least by electrical insulation and possibly also by a shield. Each of the wires 51, 52 is crimped to a crimp connection 212, 222 of a crimp contact 21, 22, 22' in a stripped area Only one power wire 52' is illustrated in FIG. 5b; the other power wires 52 are not shown for reasons of clarity. This power wire 52' is connected to the crimp connection 22 of a power contact, namely a central contact 22' The central contact 52' is placed in the central recess 120' of the second contact carrier part 12 (first embodiment). It is readily conceivable that, by joining the second contact carrier part 12 to the first contact carrier part 11 of FIG. 4b, the central contact 22' is automatically arranged substantially centrally in the mating face (see FIGS. 1a and b).

However, a second embodiment of the contact carrier shall be presented below.

Figures 6A, 6B:
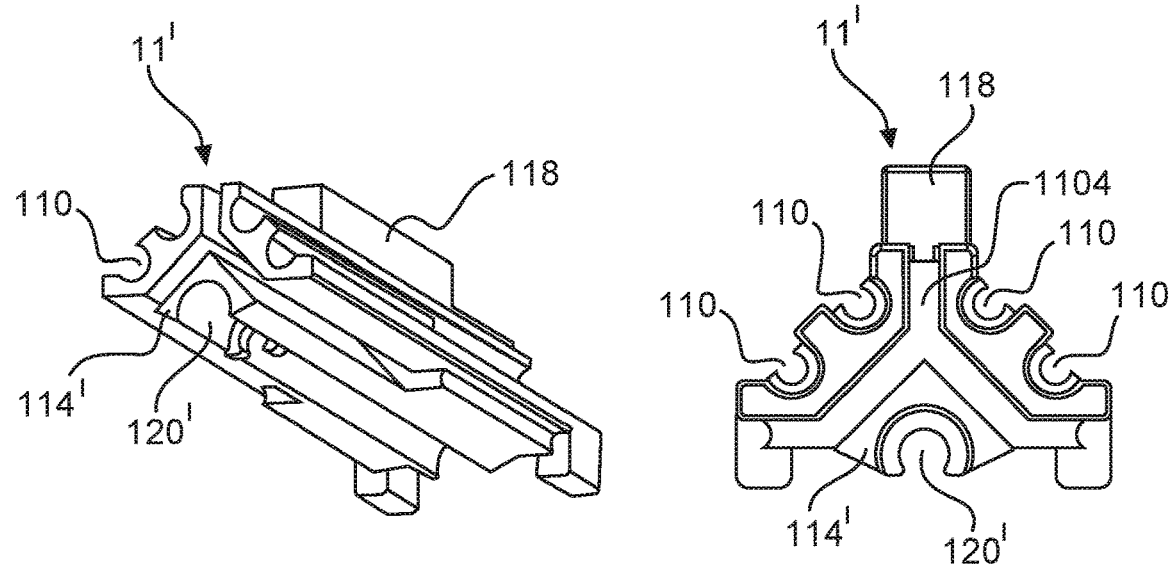
FIGS. 6a, b show the first contact carrier part in a second embodiment.

FIG. 6a shows a first contact carrier part 11' in a second embodiment. This differs from the previous contact carrier part 11 in that the central contact receptacle 120' is arranged on its holder 114. That is to say, in this design, the central contact 22' can latch to the holder 114 of the first contact carrier part 11.

Figures 7A, 7B:
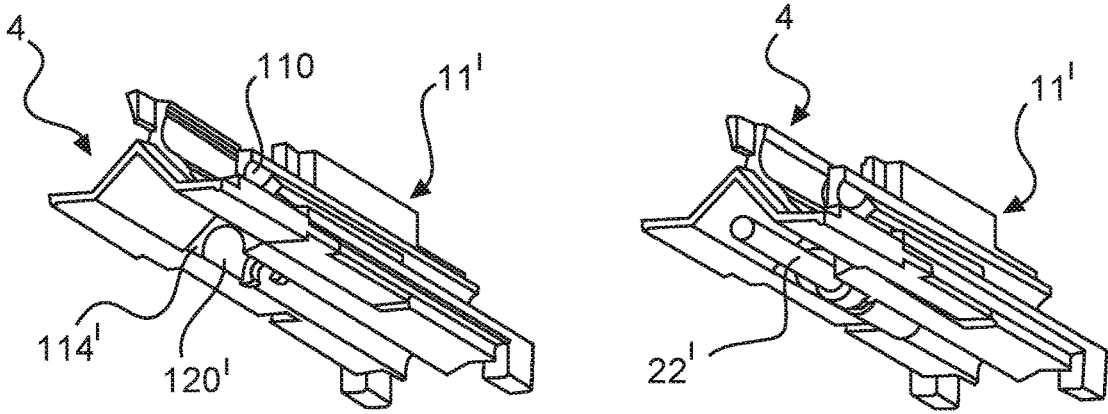
FIG. 7a, b show the above-mentioned contact carrier part with the shield element and the central contact.

As revealed in FIGS. 7a and b, the signal contact receptacles 110 are still separated from each other by the Y-shaped shield element 4 since, in this regard, the holder 114 is located on the side with the power contact receptacles 120.

Figure 8A:
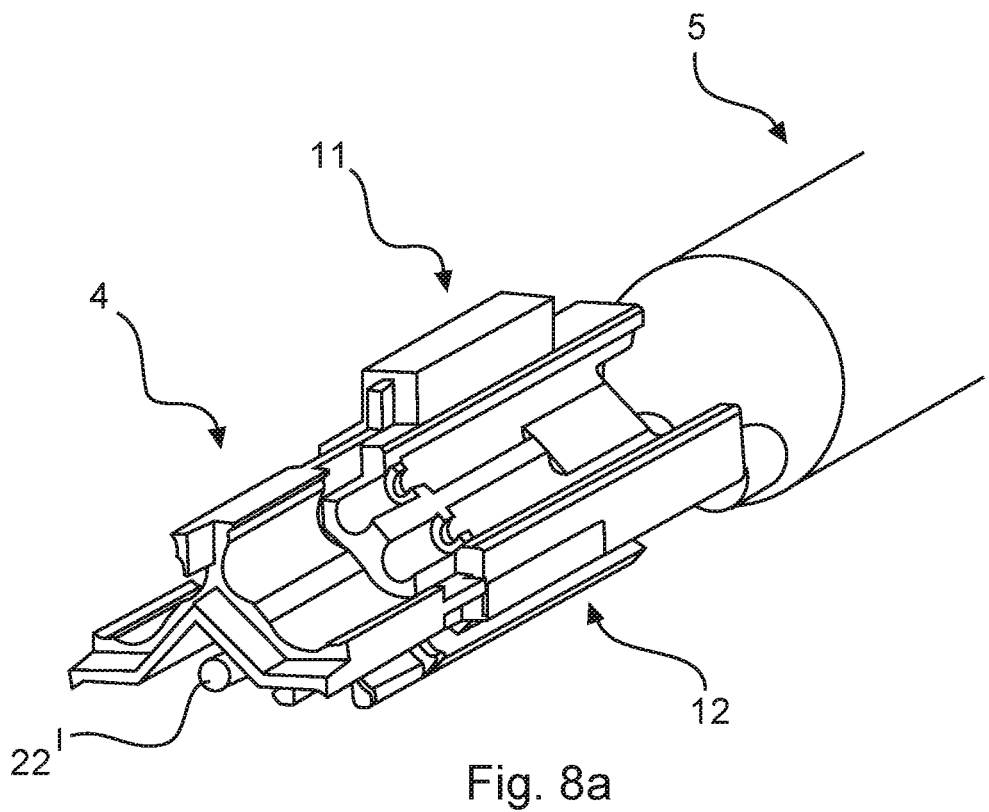
FIGS. 8a, b show the above-mentioned arrangement with the shield element additionally held thereon and the second contact carrier part latched thereto in a second embodiment.

FIG. 8a shows the first 11 and second 12 contact carrier part with the Y-shaped shield element 4 and the inserted central contact 22' in the first embodiment.

Figure 8B:
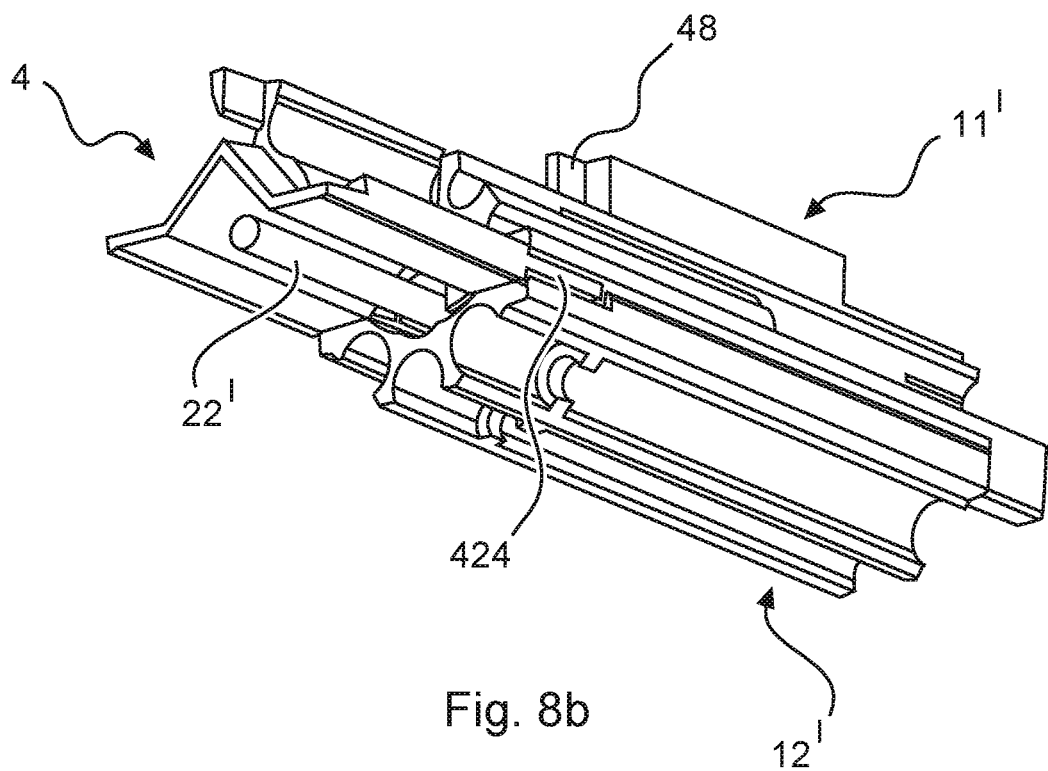

FIG. 8b shows the first 11' and second 12' contact carrier part with the Y-shaped shield element 4 and the inserted central contact 22' in the second embodiment. In this case, the function of the stop step 424 can be seen particularly clearly. The stop step 424 prevents the second contact carrier part 12' being displaced in the direction of the mating side, i.e. to the left in the drawing.

Using the example of the second embodiment, FIGS. 9a-d show a latching mechanism for fixing the first 11' and the second 12' contact carrier part to each other.

Figure 9A:
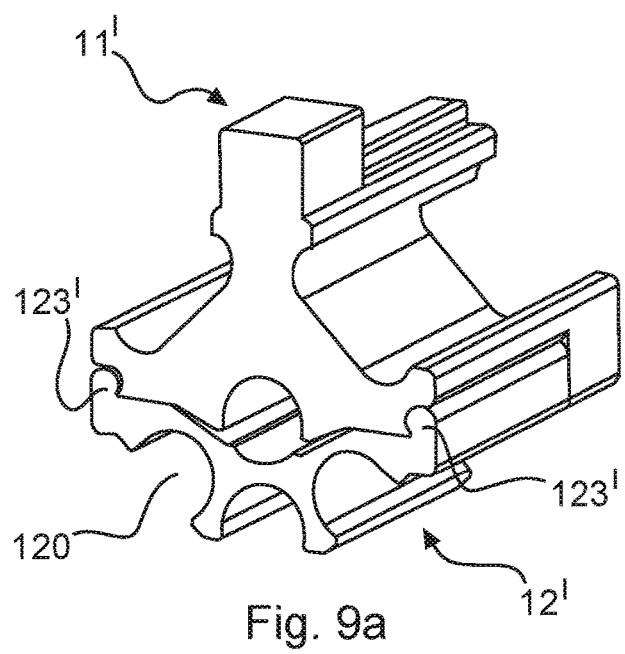
FIGS. 9a-d show the latching mechanism between the first and the second contact carrier part.
Figure 9B:
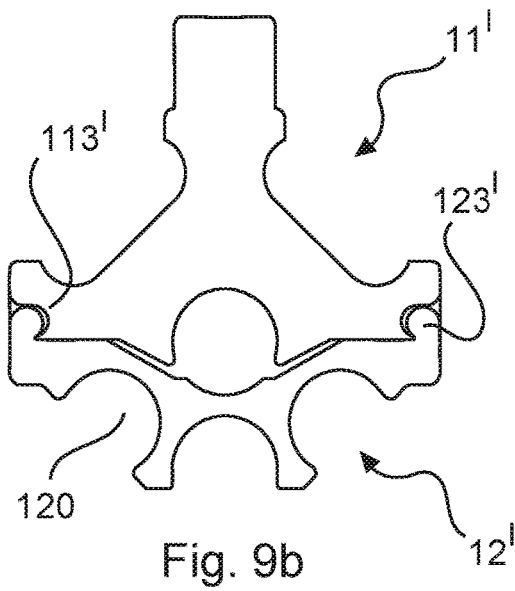
Figure 9C:
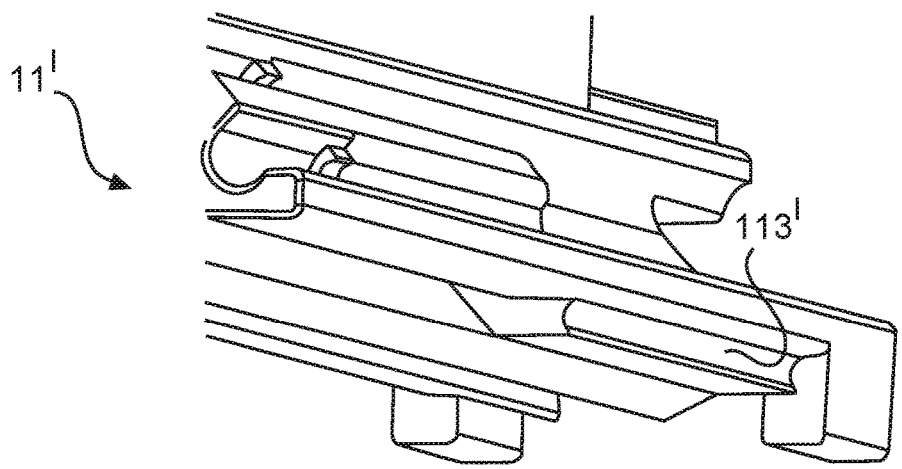

FIGS. 9a and 9b show the first 11' and second 12' contact carrier part in the latched state in a section through the portion on the cable connection side.

Figure 9D:
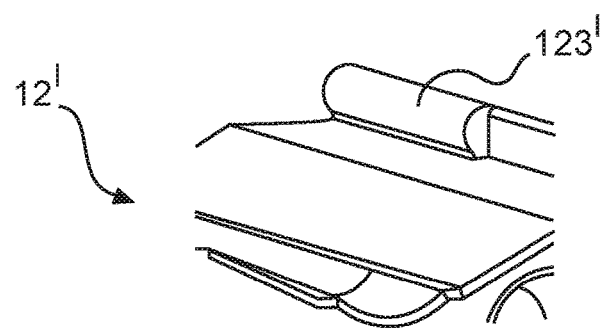

To this end, in a portion on the cable connection side, the first contact carrier part 11' has, mutually opposed at its two limb ends, a respective latching recess 113' which has a hollow cylinder segment-like design in the present example and is shown explicitly in FIGS. 9d and c.

As a counter-piece to this, a hollow cylinder segment-like latching molding 123' is illustrated explicitly in FIG. 9d.

It is readily conceivable that a latching of these two contact carrier parts 11', 12' to each other is enabled via the elasticity of the plastic material, in particular as a result of a slight deformation of the second contact carrier part 12'.

Figure 10A:
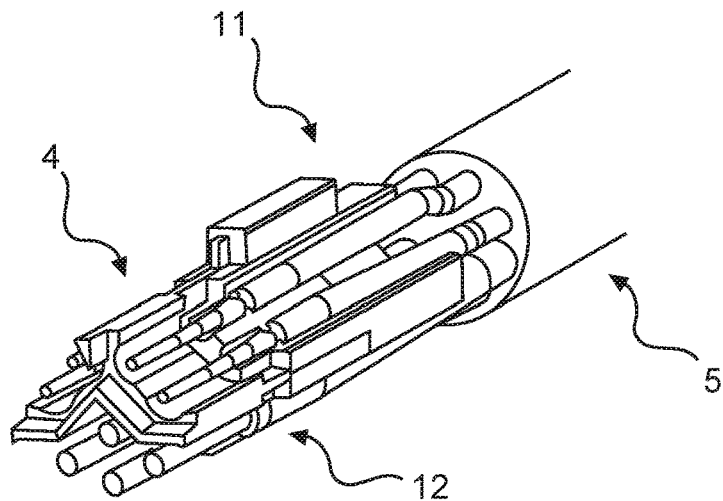
FIGS. 10a-c show the arrangement of FIG. 8 with the remaining contacts additionally placed therein.
Figure 10B:
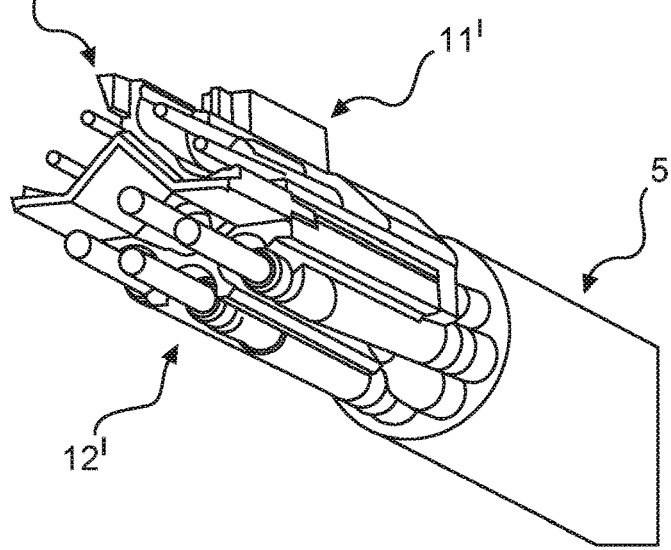

FIGS. 10 a-b show this latched arrangement with the Y-shaped shield element and inserted crimp contacts 2, in the first (FIG. 10a) and the second (FIG. 10b) embodiment.

Figure 10C:
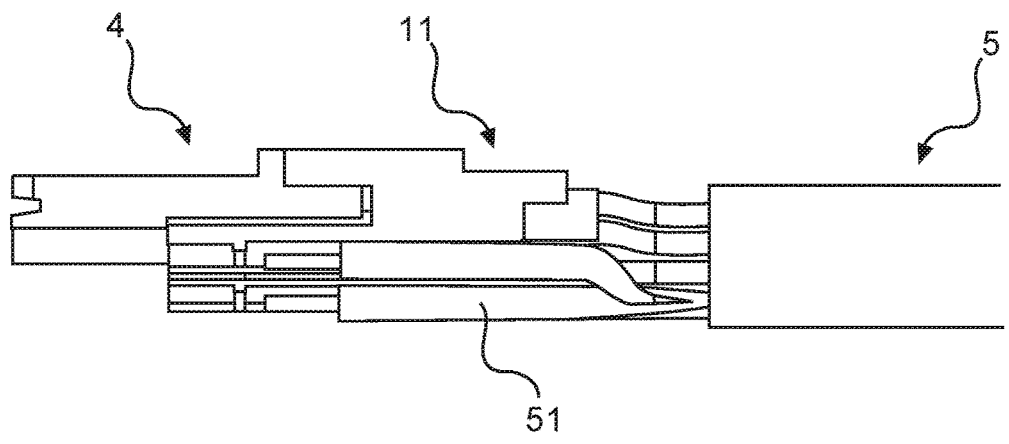

FIG. 10c shows this arrangement without the crimp contacts 2 in cross-section. It is clear from this that the Y-shaped shield cross 4 "overlaps" the insulations and possibly also the shield of the wires 51 in the mating direction.

FIG. 11 shows the above-mentioned arrangement together with the third, sleeve-shaped contact carrier part 13.

Figure 11A:
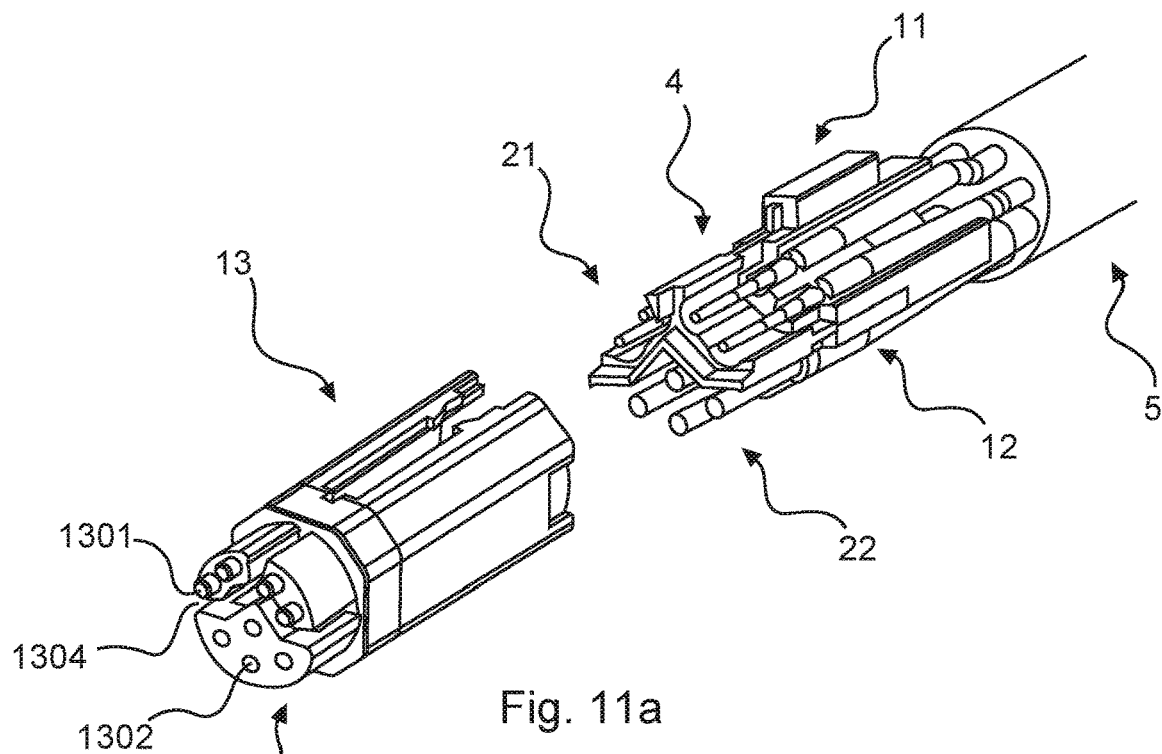
FIG. 11a shows the above-mentioned arrangement with the third contact carrier part in the state for insertion.

In FIG. 11a, this arrangement is shown still separate from the third contact carrier part 13, namely the sleeve, and is about to be pushed into the sleeve 13 through the insertion opening 130 thereof.

Figure 11B:
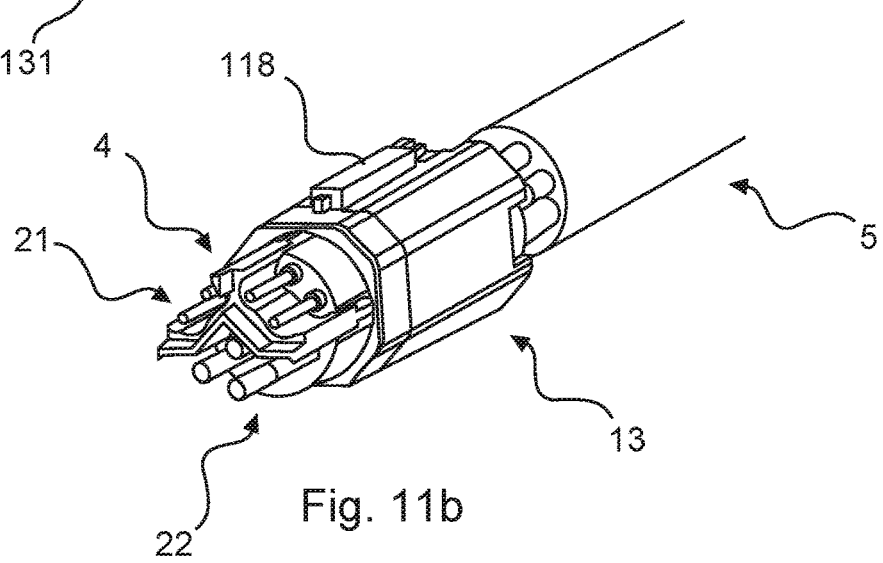
FIGS. 11b-c show the above-mentioned arrangement in the inserted state.
Figure 11C:
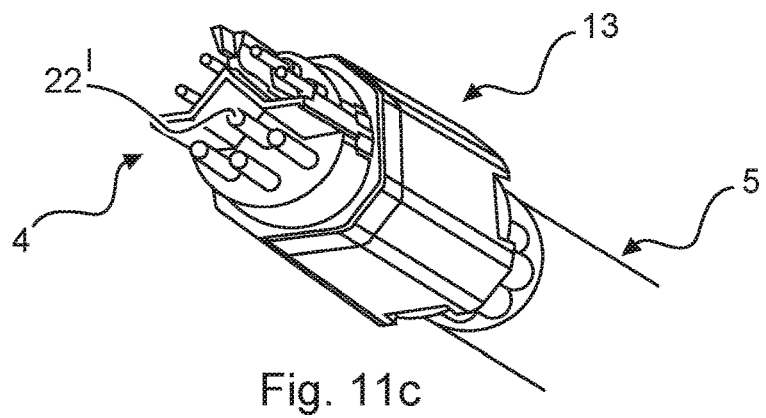

FIGS. 11b and 11c show the arrangement in a state in which it is pushed into the sleeve 13 (third contact carrier part). In this case, the cuboidal latching molding 118 is incorporated in the latching slot 1308 and latched thereto by means of the latching hooks 133 (see FIGS. 1c and d). The contact carrier 1 is therefore assembled and the central contact 22' is arranged substantially centrally in the mating face, i.e. centrally in the mating portion 131 as seen from the mating direction. The further crimp contacts 21, 22 are also received in the contact carrier and protrude with their respective mating areas 211, 221 through the corresponding through openings 1301, 1302 of the mating portion 131.

Figure 12A:
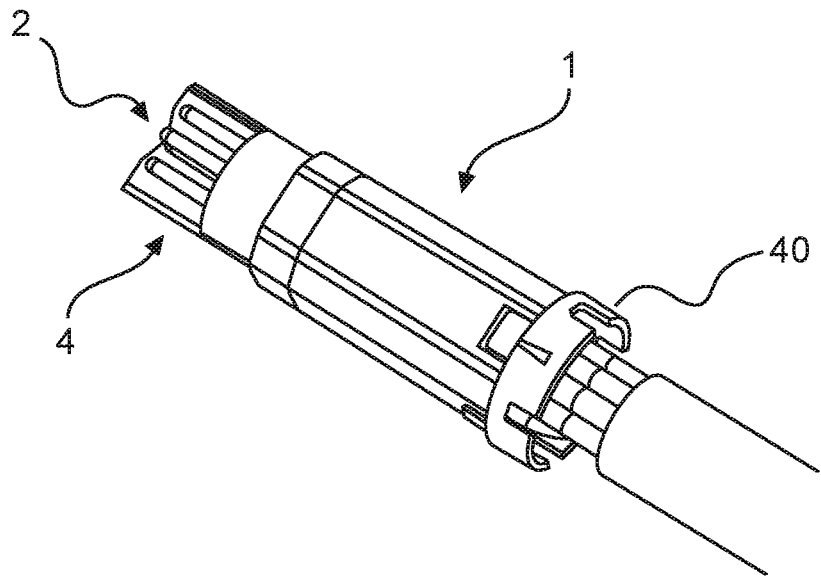
FIG. 12a shows the above-mentioned arrangement with a shield connecting element.

FIG. 12a shows the assembled contact carrier 1, which is equipped with crimp contacts 2 and the shield cross 4 and has a substantially hollow-cylindrical shield connecting element 40, which is provided to connect a shield braid of the cable 5 (not shown for reasons of clarity) to a metallic plug connector housing 7 (shown below).

Figure 12B:
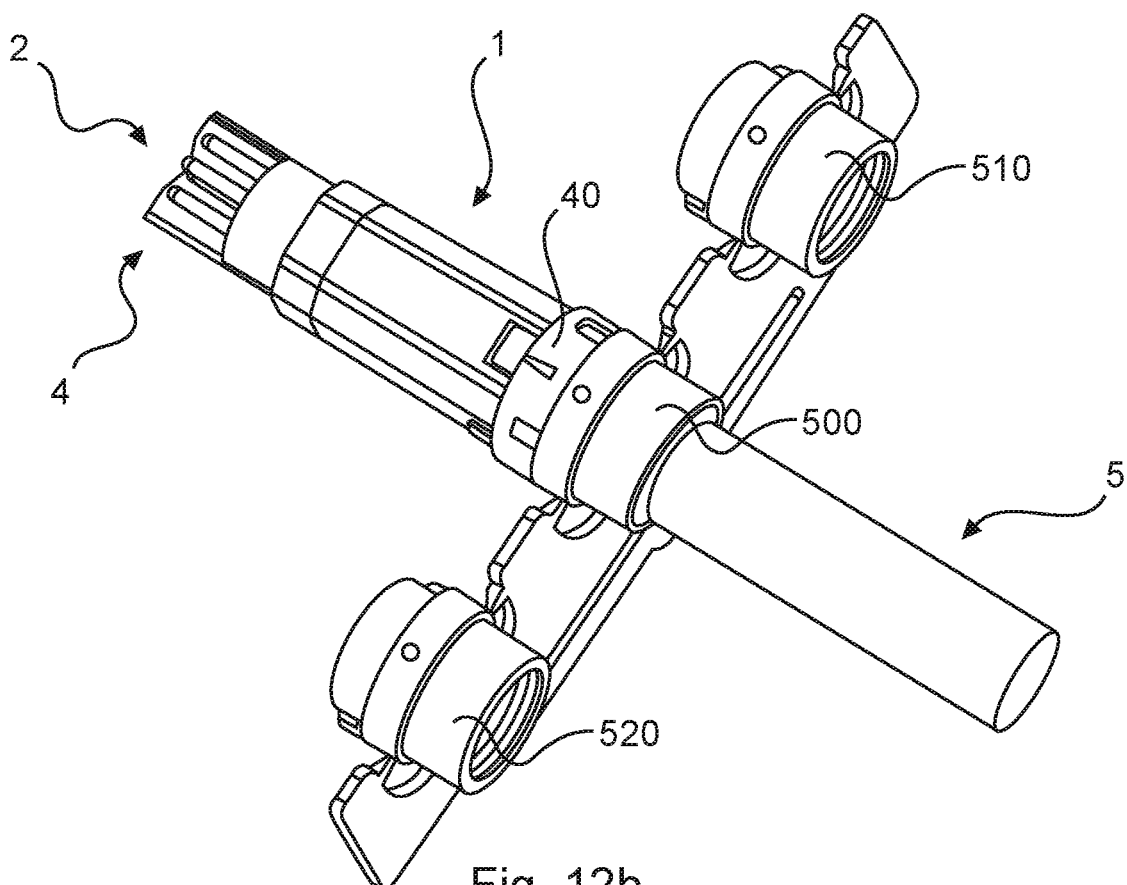
FIG. 12b shows the above-mentioned arrangement with a selected sealing ring.

FIG. 12b moreover shows a selection of sealing elements in the form of sealing rings 500, 510, 520, which differ in terms of their internal diameter and are provided for different cable cross-sections.

Figure 12C:
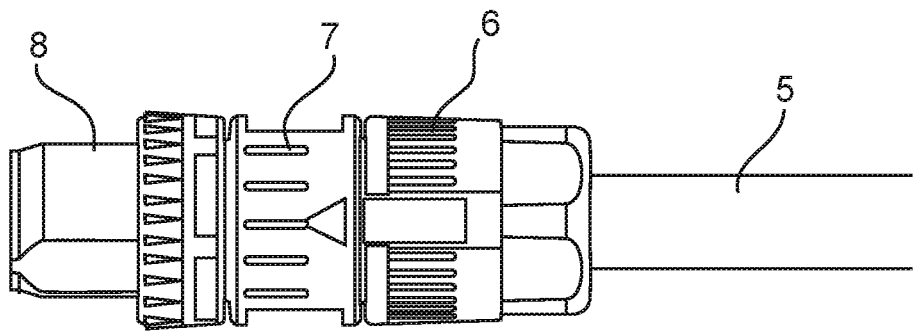
FIGS. 12c-e show the above-mentioned arrangement with a plug connector housing, a cable gland a mating-side union nut.
Figure 12D:
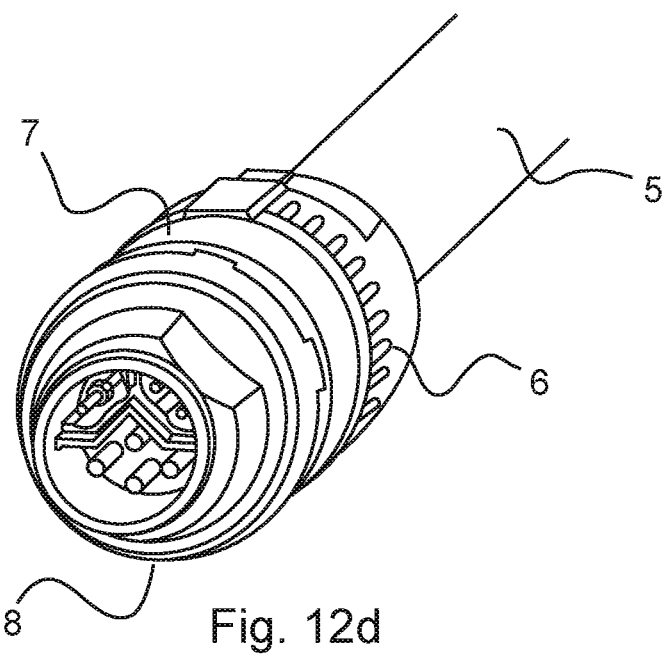
Figure 12E:
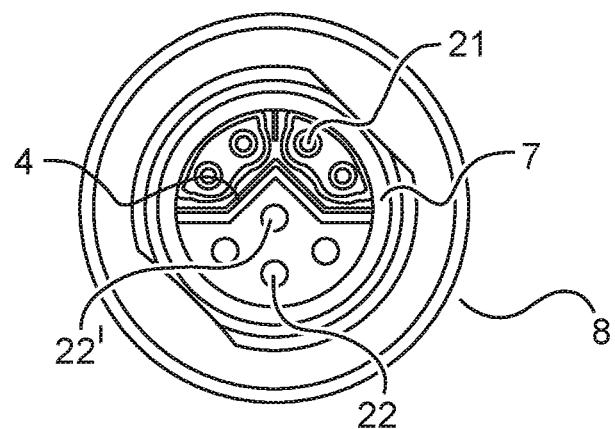

FIGS. 12c-e show, from various views, the entire, assembled plug connector with the connected cable 5 as viewed from the outside in each case. The plug connector has a cable gland 6 with a molded union nut, which is screwed to the actual plug connector housing 7 on the cable connection side and thus fixes the cable 5 on the plug connector housing 7. On the mating side, a knurled screw 8 is rotatably held on the plug connector housing 7 for locking/screwing to a mating connector on the mating side.

In particular, FIG. 12e shows how the central contact 22' is arranged substantially centrally in the mating portion 131, i.e. substantially centrally in the mating face, as seen from the mating direction. Upon closer inspection, a person skilled in the art can see that the central contact 22' does not lie exactly on the center axis but is arranged such that it is offset downwards by approximately 5% of the diameter in the drawing. This corresponds, for example, to Standard IEC 61076-2-113 of 2017.

At least the plug connector housing 7 consists of a metallic material. For stability and shielding reasons, the cable gland 6 and the knurled screw 8 can also consist of a metallic material or, in a further embodiment, also of plastic.

Even where combinations of different aspects of features of the invention are shown in the figures in each case, it is clear to a person skilled in the art—unless indicated otherwise—that the combinations shown and discussed are not the only possible combinations. In particular, mutually corresponding units or feature complexes from different exemplary embodiments can be interchanged with each other.

LIST OF REFERENCE SIGNS

1 Contact carrier (multi-part)
11, 11' First contact carrier part (signal contact carrier)
110 Signal contact receptacles
1104 Y-shaped receiving slot
113' Latching recess
114, 114' Holder
118 Cuboidal latching molding
12 Second contact carrier part (power contact carrier)
120, 120' Power contact receptacles, central contact receptacle
123' Cylinder segment-like latching molding
124 Contact surface
13 Third contact carrier part (sleeve)
130 Insertion opening on the cable connection side
1301 Signal contact through-opening
1302, 1302' Power contact through-opening, Central contact through-opening
1304 Shield element through-opening
1308 Latching slot 131 Mating portion
1310 Mating surface
133 Latching hook
2 Crimp contacts
21 Signal contact(s)
211 Mating area (signal contact)
212 Crimp connection (signal contact)
22, 22' Power contact(s); central contact
221 Mating area (power contact)
4 Y-shaped shield element
41 First portion of the Y-shaped shield element
42 Second portion of the Y-shaped shield element
43 Third portion of the Y-shaped shield element
423, 433 Anti-twist surfaces
424 Stop step
40 Shield connection element
48 Stop molding/ground connection element
5 Multi-wire electric ("hybrid") cable
50 Wires of the cable
51 Signal wires
52 Power wires
500, 510, 520 Various sealing elements/sealing rings
6 Cable gland/union nut
7 Plug connector housing
8 Knurled screw/mating-side locking means

The invention claimed is:

1. A contact carrier (1) for a plug connector, for receiving at least four electrical crimp contacts (2), of which at least two are designed as signal contacts (21) and at least a further two are designed as power contacts (22),
wherein the contact carrier (1) has
at least two signal contact receptacles (110) and
at least two power contact receptacles (120) and
is furthermore designed in multiple parts, wherein
a first contact carrier part (11) comprises the at least two signal contact receptacles (110) and
a second contact carrier part (12) comprises at least one of the power contact receptacles (120),
wherein a further one of the power contact receptacles is arranged as a central contact receptacle (120') in the contact carrier (1), between the first (11) and the second (12) contact carrier part, for receiving one of the power contacts, which is a central contact (22'), so that the entire contact carrier (1) has a total of at least four contact receptacles (110, 120, 120'),
wherein at least one of the two contact carrier parts (11, 12) comprises a holder (114),
wherein a Y-shaped receiving slot (1104) is formed in the contact carrier (1) so that a Y-shaped shield element (4) can be held on the holder (114), and
wherein the shield element can separate at least two signal contact receptacles (110) from each other and from the power contact receptacles (120, 120').

2. The contact carrier (1) as claimed in claim 1,
wherein the first contact carrier part (11) comprises two pairs of signal contact receptacles (110), which are separated from each other, at least in certain areas, by part of the Y-shaped receiving slot (1104) and can thus be separated by a first portion (41) of the Y-shaped shield element (4).

3. The contact carrier (1) as claimed in claim 1,
wherein the second contact carrier part (12) comprises at least three power contact receptacles (120, 120'), which are separated from the signal contact receptacles (110), at least in certain areas, by a further part of the receiving slot (1104), and can each be separated by a second (42) or third (43) portion of the shield element (4).

4. The contact carrier (1) as claimed in claim 1,
wherein the second contact carrier part (12) has a contact surface (124) in which the central contact receptacle (120') is arranged.

5. The contact carrier (1) as claimed in claim 1,
wherein the central contact receptacle (120') is arranged on the holder (114') of the first contact carrier part (11').

6. The contact carrier (1) as claimed in claim 1,
wherein the contact carrier (1) has a cylindrical basic shape and is provided for use in a circular plug connector.

7. The contact carrier (1) as claimed in claim 1,
wherein the first (11, 11') and the second (12, 12') contact carrier part can be fixed to each other.

8. The contact carrier (1) as claimed in claim 7,
wherein a third contact carrier part (13) is formed by a sleeve with an insertion opening (130) on a cable connection side, through which the first (11, 11') and the second contact carrier part (12, 12') in a fixed-together state, together with the Y-shaped shield element (4) held thereon and the crimp contacts (2) furthermore fixed thereto, can be pushed into the sleeve-shaped third contact carrier part (13).

9. The contact carrier (1) as claimed in claim 8,
wherein the third contact carrier part (13) has, opposite the insertion opening (130), a mating portion (131) with through-openings (1301, 1302, 1302', 1304), which are suitable for guiding-through mating areas (211, 221) of the said crimp contacts (2) and for guiding-through a mating-side portion of the Y-shaped shield element (4).

10. The contact carrier (1) as claimed in claim 9,
wherein one of the through-openings, namely a central through-opening (1302'), serves for guiding-through the central contact (22') on the mating side and is arranged substantially centrally in the mating portion (131) of the contact carrier (1), as seen from the mating direction.

11. A plug connector, comprising:
a contact carrier (1)
wherein the contact carrier (1) has
at least two signal contact receptacles (110) and
at least two power contact receptacles (120),
wherein the contact carrier (1) is designed in multiple parts, wherein
a first contact carrier part (11) comprises the at least two signal contact receptacles (110) and
a second contact carrier part (12) comprises at least one of the power contact receptacles (120),
wherein a further one of the power contact receptacles is arranged as a central contact receptacle (120') in the contact carrier (1), between the first (11) and the second (12) contact carrier part, for receiving one of the power contacts, which is a central contact (22'), so that the entire contact carrier (1) has a total of at least four contact receptacles (110, 120, 120'),
wherein at least one of the two contact carrier parts (11, 12) comprises a holder (114), and
wherein a Y-shaped receiving slot (1104) is formed in the contact carrier (1);
a Y-shaped shield element (4) arranged within the Y-shaped receiving slot (1104), wherein the Y-shaped shield element separates at least two signal contact receptacles (110) from each other and from the power contact receptacles (120, 120'); and eight crimp contacts (2),
wherein four of the eight crimp contacts (2) are designed as signal contacts (21) and
wherein a further four of the eight crimp contacts (2) are designed as power contacts (22),
wherein the crimp contacts (2) each comprise a cylindrical mating area (211, 221), which is formed as a contact pin in each case, and
wherein the contact pins (211) of the signal contacts (21) have a diameter which is smaller than the diameter of the contact pins (221) of the power contacts (22).

12. The plug connector as claimed in claim 11, further comprising:
a plug connector housing (7) with a mating side locking means (8) and a cable gland (6), and
at least one sealing element (500, 510, 520).

13. A plug connector, comprising:
a contact carrier (1),
wherein the contact carrier (1) has
at least two signal contact receptacles (110) and
at least two power contact receptacles (120),
wherein the contact carrier (1) is designed in multiple parts, wherein
a first contact carrier part (11) comprises the at least two signal contact receptacles (110) and
a second contact carrier part (12) comprises at least one of the power contact receptacles (120),
wherein the first (11, 11') and the second (12, 12') contact carrier part can be fixed to each other,
wherein a further one of the power contact receptacles is arranged as a central contact receptacle (120') in the contact carrier (1), between the first (11) and the second (12) contact carrier part, for receiving one of the power contacts, which is a central contact (22'), so that the entire contact carrier (1) has a total of at least four contact receptacles (110, 120, 120'),
wherein at least one of the two contact carrier parts (11, 12) comprises a holder (114), and
wherein a Y-shaped receiving slot (1104) is formed in the contact carrier (1);
a Y-shaped shield element (4); and
eight crimp contacts (2),
wherein four of the eight crimp contacts (2) are designed as power contacts and
wherein a further four of the eight crimp contacts (2) are designed as signal contacts,
wherein the crimp contacts (2) each comprise a hollow cylindrical mating area, and
wherein each hollow cylindrical mating area forms a respective contact socket,
wherein the contact sockets of the power contacts have an internal diameter which is greater than the internal diameter of the contact sockets of the signal contacts,
wherein a third contact carrier part (13) is formed by a sleeve with an insertion opening (130) on a cable connection side, through which the first (11, 11') and the second contact carrier part (12, 12') in a fixed-together state, together with the Y-shaped shield element (4) held thereon and the crimp contacts (2) furthermore fixed thereto, can be pushed into the sleeve-shaped third contact carrier part (13), and wherein the third contact carrier part (13) has, opposite the insertion opening (130), a mating portion (131) with through-openings (1301, 1302, 1302', 1304), which are suitable for guiding-through mating areas (211, 221) of the said crimp contacts (2) and for guiding-through a mating-side portion of the Y-shaped shield element.

14. The plug connector as claimed in claim 13,
wherein the signal contacts (21) are integrated in the signal contact receptacles (110) of the first contact carrier part (11),
wherein the power contacts (22, 22') are integrated in the power contact receptacles (120) of the first (11) and/or the second (12) contact carrier part,
wherein the Y-shaped shield element (4) is fixed to the first contact carrier part (11), wherein the first (11, 11') and the second (12, 12') contact carrier part are latched to one another,
wherein the first (11, 11') and the second (12, 12') contact carrier part in a fixed-together state, together with the Y-shaped shield element (4) and the crimp contacts (2), are inserted into the third contact carrier part (13) designed in the shape of a sleeve,
wherein the mating areas (211, 221) of the crimp contacts (2) and a mating-side portion of the shield cross (4) are arranged at least partially in the through-openings (1301, 1302, 1304) of the mating portion (131) of the third contact carrier part (13).

15. The plug connector as claimed in claim 14,
wherein the central contact (22') is received in the central contact receptacle (120') and thus arranged substantially centrally in the contact carrier (1).

16. A method for assembling a plug connector, comprising the following steps:
providing a multi-part contact carrier (1)
wherein the contact carrier (1) has
at least two signal contact receptacles (110) and
at least two power contact receptacles (120),
wherein the contact carrier (1) is designed in multiple parts, wherein
a first contact carrier part (11) comprises the at least two signal contact receptacles (110) and
a second contact carrier part (12) comprises at least one of the power contact receptacles (120),
wherein a further one of the power contact receptacles is arranged as a central contact receptacle (120') in the contact carrier (1), between the first (11) and the second (12) contact carrier part, for receiving one of the power contacts, which is a central contact (22'), so that the entire contact carrier (1) has a total of at least four contact receptacles (110, 120, 120'),
wherein at least one of the two contact carrier parts (11, 12) comprises a holder (114), and
wherein a Y-shaped receiving slot (1104) is formed in the contact carrier (1);
providing a Y-shaped shield element (4) arranged within the Y-shaped receiving slot (1104),
wherein the Y-shaped shield element separates at least two signal contact receptacles (110) from each other and from the power contact receptacles (120, 120');
providing eight crimp contacts (2),
wherein four of the eight crimp contacts (2) are designed as signal contacts (21) and a further four of the eight crimp contacts (2) are designed as power contacts (22), wherein the crimp contacts (2) each comprise a cylindrical mating area (211, 221), which is formed as a contact pin in each case, and wherein the contact pins (211) of the signal contacts (21) have a diameter which is smaller than the diameter of the contact pins (221) of the power contacts (22);

mounting the Y-shaped shield element (4) on the holder (14, 14') of the multi-part contact carrier (1);

crimping electrical conductors (52, 52') to the crimp contacts (2);

placing the central contact (22') in the associated power contact receptacle (120') of the multi-part contact carrier (1);

mutually fixing the first and the second contact carrier part (11, 11', 12, 12') to each other;

incorporating the remaining power contacts (22) in the power contact receptacles (120) of the second contact carrier part (12) and the four signal contacts (21) in the signal contact receptacles (110) of the second contact carrier part (11, 11'); and jointly pushing the first (11, 11') contact carrier part and the second (12, 12') contact carrier part, fixed thereto, with the Y-shaped shield element (4) held thereon and the crimp contacts (2) received therein into the third contact carrier part (13) through the insertion opening (130).

\* \* \* \* \*